United States Patent

[15] 3,668,743

Roberts

[45] June 13, 1972

[54] STRAP TENSIONING DEVICES

[72] Inventor: Richard Walter Roberts, Tarporley, England

[73] Assignee: B. Dixon-Bate Limited, Chester, Cheshire, England

[22] Filed: Nov. 24, 1970

[21] Appl. No.: 92,493

[30] Foreign Application Priority Data

Nov. 25, 1969  Great Britain......................57,520/69

[52] U.S. Cl. ..........................................24/68 CT, 248/361 A
[51] Int. Cl................A43c 11/00, A44b 21/00, A62b 35/00
[58] Field of Search................24/68 E, 68 D, 68 CD, 68 CT, 24/2 T; 248/351 A

[56] References Cited

UNITED STATES PATENTS

| 2,442,266 | 5/1948 | Davis | 248/361 |
| 3,478,394 | 11/1969 | Davis | 248/361 A |
| 2,679,670 | 6/1954 | Griswold | 248/361 A |
| 2,867,406 | 1/1959 | Davis | 24/68 CTD |
| 3,178,785 | 4/1965 | Jellison | 24/68 CTD |

*Primary Examiner*—Paul R. Gilliam
*Attorney*—Holman & Stern

[57] ABSTRACT

A tensioning device for a strap which is used to secure cargo in position and in which the tensioning device has at one end a slidable locking means and at the other end a pivotal locking means and with the strap wound around and through the tensioning device such that a mechanical advantage of at least 3:1 is obtained when tautening the strap.

3 Claims, 3 Drawing Figures

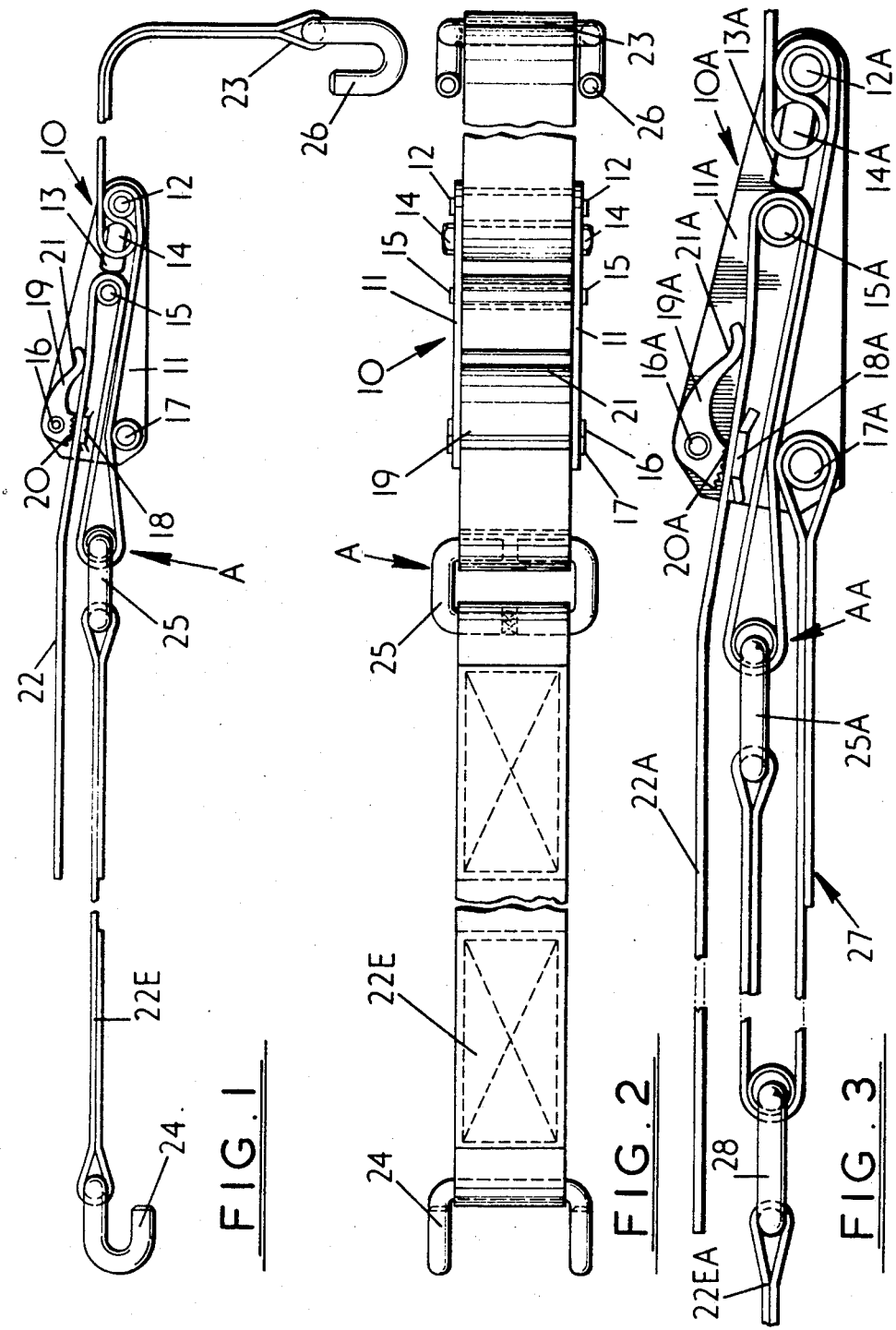

STRAP TENSIONING DEVICES

BACKGROUND OF THE INVENTION

This invention relates to tensioning devices for use with load or cargo securing straps or the like.

It is an object of the present invention to provide a strap tensioning device which is efficient in use and which permits adequate strap tautening irrespective of the nature of the load or cargo.

SUMMARY OF THE INVENTION

According to the present invention, there is provided a tensioning device for a load securing strap or the like comprising a strap locking or gripping means at or adjacent one or each end of the device.

Also according to the present invention, there is provided a load or cargo securing means comprising a strap or the like of convenient length having at one end a ring, hook or the like for engaging the load support and being threaded through a tensioning device along a path through a locking means at one end of the device, through the length of the device and beyond and then back to a point substantially midway of the device, to form a loop and back again through with a locking means at the other end of the device, a ring, hook or the like for engaging the load support being freely supported in the loop.

Embodiments of the present invention will now be described, by way of example, with reference to the accompanying drawing, in which:

BRIEF DESCRIPTION OF THE DRAWINGS

FIG. 1 is a side elevation of a load securing strap and tensioning device according to the present invention with a side plate of the latter removed;

FIG. 2 is a plan view of FIG. 1; and,

FIG. 3 is a view similar to FIG. 1 of a modified tensioning device.

DETAILED DESCRIPTION OF THE INVENTION

Referring to FIGS. 1 and 2, the tensioning device 10 is of lightweight construction and comprises a metal frame in which two side plates or members 11 at one end are interconnected by a transverse cylindrical spacer 12. Each side plate or member 11 adjacent said spacer 12 and remote from its end is formed with an elongate rectangular slot 13 and a slider pin 14 extends between and through the slots 13 whereby it can be moved towards or away from the spacer 12.

The side plates or members 11 substantially midway of their ends are interconnected by a transverse roller 15.

At the other end of the tensioning device, the side plates or members 11 are interconnected by two vertically spaced spacers 16 and 17 and a plate 18 located between the spacers 16 and 17. A locking member 19 with a serrated surface 20 for engaging the plate 18 is pivotally mounted on the upper of the two vertically spaced spacers, namely spacer 16, and has a tail 21 inboard of the adjacent end of the tensioning device, with the tail 21 tending to lie in the path of a strap 22 threaded through the tensioning device as hereinafter described.

The strap 22 may be of any convenient strong material, for example, webbing and of any convenient length. At one end, the strap 22 has secured thereto in a loop 23, a D-ring, hook or other element 24 for engaging, say, a securing hook on one side of the body of a flat bed truck, for example. The strap 22 is then threaded through the tensioning device as follows (the device being horizontally disposed with the pivoted locking member 19 above the locking plate 18):

The strap 22 is threaded between the side plates or members 11 over and under the slider pin 14, then over and under the adjacent spacer 12, then through the length of the device frame and beyond to location A and then back thus forming a loop, then between the spacer 17 and plate 18 and around and over the midway roller 15 and finally out of the frame after passing between the locking member 19 and locking plate 18 leaving a free end.

The tail 21 of the locking member 19 is engaged by the strap 22 and is urged upwardly to pivot the serrated surface 20 towards the locking plate 18 thus to grip or lock the strap 22.

A rectangular ring or similar component 25 is freely held in the strap loop at A and a strap extension 22E is freely connected at one end to the ring 25 and has in a loop at its other end a D-ring or hook 26 for engaging, say, a securing hook on the other side of the body of a flat bed truck.

It will be manifest that if the length of strap 22 beyond the tensioning device is sufficiently long then the ring 25 and strap extension 22E can be dispensed with, and the D-ring or hook 26 simply connected to the strap 22.

Let us assume a load to be secured is located on a flat bed truck. The D-ring 26 remote from the tensioning device is engaged on a hook at the side of the truck and the strap 22 is located over the top of the load. The length of the strap loop is adjusted (lengthened or shortened) by moving the slider pin 14 away from the spacer 12 and moving the strap 22 through the device frame until the other D-ring 24 can be engaged on a hook on the other side of the truck, with the slider pin then being released to grip or hook the strap between itself and the spacer 12. The tensioning device 10 is then pushed along the strap away from the D-ring 24 as high up the load as can be conveniently managed. Finally, to tauten the strap, the free end of the strap 22 is pulled thus effecting a tautening action and giving effective securement of the load. When the load is considered sufficiently secure, the free strap end is released and the strap acts on the locking member tail 21 and urges the locking member 19 towards the locking plate 18 to effect a gripping action of the tautened strap.

To release the tensioning device and tautened strap, the tail 21 of the locking member 19 is simply pressed inwardly and the tensioning device 10 and strap 22 can then be relatively moved to release the load.

The above described tensioning device and strap assembly provides a mechanical advantage when tautening of 3 to 1.

FIG. 3 shows a similar assembly which provides a mechanical advantage of 5 to 1 when tautening.

In the assembly of FIG. 3, the arrangement is substantially identical with FIGS. 1 and 2 and similar parts are referred to by the same references with the suffix "A." However, in this instance, to give the increased mechanical advantage, there is disposed between the ring 25A and the strap extension 22EA a subsidiary strap 27. This strap 27 is looped around the ring 25A then extended away from the tensioning device 10A, passed through another rectangular ring or similar component 28 to which the strap extension 22EA is secured and then back towards the tensioning device 10A where it is looped around and secured to the spacer 17A.

The functioning of this tensioning device and strap assembly is as described with reference to FIGS. 1 and 2.

In the above tensioning devices, the spacer and slider pin may be replaced by another locking member and locking plate if desired.

The locking member or members instead of being urged to gripping position by the strap may be spring urged to gripping position.

The strap and tensioning devices may be employed to secure cargoes and loads other than those located on flat bed trucks. They may, for example, be used for cargo securement in containers.

What we claim is:

1. A load securing means comprising a tensioning device defined by a pair of spaced apart side plates, a transverse spacer interconnecting the side plates at one end thereof, each side plate adjacent the spacer having an elongated slot therein, a transverse slider pin extending between and through the slots whereby the pin can be moved towards or away from the spacer, a transverse member interconnecting the side plates between the elongated slots and the other end of the side plates, two vertically spaced transverse spacers interconnecting the other end of the side plates, a transverse plate located between the two vertically spaced spacers and secured to the side plates, a locking member pivotally mounted on the uppermost of the two vertically spaced spacers, said locking member having a serrated surface facing the transverse plate and a tail portion inboard of said other end of the side plates normally lying in the path of a strap passing through the device, and a single strap of convenient length having at one end means for engaging a load support, said strap being threaded between the side plates over and under the transverse slider pin, then over and under the transverse spacer, through the length of the device and then back thus forming a loop, between the uppermost of the two vertically spaced spacers and the transverse plate, around and over the transverse member, then between the locking member and transverse plate beyond the side plates thereby leaving a free end, with the tail portion of the locking member being engaged by the strap and urged upwardly to pivot the serrated surface toward the transverse plate to grip the strap, and means for engaging the load support freely supported in the loop.

2. The securing means as claimed in claim 1 in which the said last-named means is freely supported in the strap loop through the intermediary of a strap extension.

3. The securing means as claimed in claim 1, in which said last-named means in the strap loop has connected thereto a secondary strap which passes through a ring and is then returned and secured to the tensioning device, with said ring having secured thereto a strap extension having at its free end means for engaging the load support.

* * * * *